US011687921B2

(12) United States Patent
Wang et al.

(10) Patent No.: US 11,687,921 B2
(45) Date of Patent: Jun. 27, 2023

(54) METHOD AND DEVICE FOR CONTROL OF BLOCKCHAIN DATA ACCESS BASED ON SMART CONTRACT (71) Applicant: CHINA UNIONPAY CO., LTD., Shanghai (CN)

(72) Inventors: Hehe Wang, Shanghai (CN); Yuzhuang Xu, Shanghai (CN); Tao Zhu, Shanghai (CN); Yu Zhou, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 17/595,767

(22) PCT Filed: Sep. 23, 2020

(86) PCT No.: PCT/CN2020/117172
§ 371 (c)(1),
(2) Date: Nov. 23, 2021

(87) PCT Pub. No.: WO2021/129004
PCT Pub. Date: Jul. 1, 2021

(65) Prior Publication Data
US 2022/0327531 A1    Oct. 13, 2022

(30) Foreign Application Priority Data
Dec. 25, 2019 (CN) .................. 201911355239.X (51) Int. Cl.
*G06Q 20/38* (2012.01)
*G06Q 20/40* (2012.01)
*H04L 9/32* (2006.01)

(52) U.S. Cl.
CPC ... *G06Q 20/3827* (2013.01); *G06Q 20/38215* (2013.01); *G06Q 20/407* (2013.01); *G06Q 20/4014* (2013.01); *H04L 9/3297* (2013.01)

(58) Field of Classification Search
CPC ......... G06Q 20/3827; G06Q 20/38215; G06Q 20/4014; G06Q 20/407; G06Q 40/08;
(Continued)

(56) References Cited

U.S. PATENT DOCUMENTS

2016/0283920 A1    9/2016  Fisher et al.
2019/0228086 A1    7/2019  Bordens et al.
2019/0280855 A1*   9/2019  Tong .................... H04L 9/0637

FOREIGN PATENT DOCUMENTS

CN    106991334 A    7/2017
CN    108932297 A    12/2018
(Continued)

OTHER PUBLICATIONS

Shetty et al. "Blockchain for Distributed Systems Security", IEEE Press, IEEE Computer Society, Wiley-IEEE Press, Mar. 4, 2019, 347 pages (Year: 2019).*
(Continued)

*Primary Examiner* — James D Nigh
(74) *Attorney, Agent, or Firm* — Anova Law Group, PLLC (57) ABSTRACT The present disclosure provides a method and a device for control of blockchain data access based on a smart contract. The method includes obtaining, by a blockchain node, an access operation request of an institution, the access operation request including a transaction identifier of a transaction to be accessed, according to the transaction identifier, determining a blockchain state corresponding to the transaction identifier, the blockchain state including a hash value of the transaction corresponding to a last time change of the blockchain state, according to the hash value of the transaction corresponding to the last time change in the blockchain state and an identifier of the institution, performing
(Continued)

data access control on the institution, obtaining control result, and transmitting the control result to the institution.

9 Claims, 3 Drawing Sheets

(58) Field of Classification Search
CPC ..... G06Q 40/04; H04L 9/3297; H04L 9/3239; H04L 9/50; H04L 63/108; G06F 2221/2137; G06F 21/645; G06F 21/64; G06F 16/27
USPC .......................................................... 705/64
See application file for complete search history.

(56) References Cited

FOREIGN PATENT DOCUMENTS

| | | |
|---|---|---|
| CN | 109447648 A | 3/2019 |
| CN | 110263579 A | 9/2019 |
| CN | 111127206 A | 5/2020 |

OTHER PUBLICATIONS

Kim Shiho et al., Advanced Applications of Blockchain Technology (Studies in Big Data) 1st ed. 2020 Edition, 2019, pp. ToC, 1-106, Springer.

The World Intellectual Property Organization (WIPO) International Search Report for PCT/CN2020/117172 dated Dec. 3, 2020 4 pages.

* cited by examiner

METHOD AND DEVICE FOR CONTROL OF BLOCKCHAIN DATA ACCESS BASED ON SMART CONTRACT

CROSS-REFERENCE TO RELATED APPLICATIONS

This application is a national phase entry under 35 U.S.C § 371 of International Application No. PCT/CN2020/117172, filed on Sep. 23, 2020, which claims priority of Chinese Patent Application No. 201911355239.X, entitled "Method and Device for Control of Blockchain Data Access Based on Smart Contract," filed with the China National Intellectual Property Administration on Dec. 25, 2019, the entire content of all of which is incorporated herein by reference.

FIELD OF THE DISCLOSURE

The present disclosure generally relates to the technical field of data processing and, more particularly, relates to a method and a device for control of blockchain data access based on a smart contract.

BACKGROUND

In a blockchain system, various institutions may not join an alliance at a same time. Some institutions may join the alliance after the alliance chain runs for a period of time. Since an institution joining the alliance earlier may already contribute or generate data, the institution joining the alliance earlier may have priority to the data contributed or generated by the institution joining the alliance earlier, and may require not to allow an institution joining the alliance subsequently to access the data contributed or generated by the institution joining the alliance earlier. Since each participating node may synchronize each block data during operation of the blockchain system, a state of each node needs to be consistent. An existing technical solution may use authority management or block compression to control access by a node subsequently joining the blockchain system, which, however, may not effectively control the subsequently joined node to access data contributed or generated before the joining of the node.

BRIEF SUMMARY OF THE DISCLOSURE

The present disclosure provides a method and a device for control of blockchain data access based on a smart contract, for improving effect of controlling a node subsequently joining a blockchain system from accessing data contributed or generated before the node joins the blockchain system.

In a first aspect, the present disclosure provides a method for control of blockchain data access based on a smart contract, including:

obtaining, by a blockchain node, an access operation request of an institution, wherein the access operation request includes a transaction identifier of a transaction to be accessed;

according to the transaction identifier, determining, by the blockchain node, a blockchain state corresponding to the transaction identifier, wherein the blockchain state includes a hash value of the transaction corresponding to a last time change of the blockchain state;

according to the hash value of the transaction corresponding to the last time change in the blockchain state and an identifier of the institution, performing, by the blockchain node, data access control on the institution, obtaining control result; and transmitting, by the blockchain node, the control result to the institution.

In the method, the blockchain node obtains the timestamp of the corresponding transaction data and the joining time of the institution through the identifier of the institution and the hash value of the transaction corresponding to the last time change of the state, and controls the data access by the institution according to the timestamp and the joining time of the institution. Thus, effect of controlling the node joining the alliance later from accessing the data before the node joins the alliance may be improved, and control efficiency may be improved.

Optionally, according to the hash value of the transaction corresponding to the last time change in the blockchain state and the identifier of the institution, performing, by the blockchain node, the data access control on the institution, obtaining the control result, includes:

according to the hash value of the transaction corresponding to the last time change in the blockchain state, determining a timestamp of the block corresponding to the hash value;

according to the identifier of the institution, determining a timestamp of the configuration block of the institution;

determining whether the timestamp of the configuration block of the institution is earlier than the timestamp of the block corresponding to the hash value; and when the timestamp of the configuration block of the institution is earlier than the timestamp of the block corresponding to the hash value, executing an access operation of the institution, determining result of the access operation as the control result, and when the timestamp of the configuration block of the institution is not earlier than the timestamp of the block corresponding to the hash value, determining that the institution is not authorized to access the transaction, and determining access denial information as the control result.

Optionally, before obtaining, by the blockchain node, the access operation request of the institution, the method also includes:

obtaining a transaction identifier of a transaction to be executed;

executing the transaction to be executed, and writing transaction data to a block; and when confirming that the transaction data are changed, updating the blockchain state, and storing a hash value of the block in the blockchain state.

Optionally, the blockchain state is a state of latest execution of the transaction corresponding to the transaction identifier.

Optionally, the identifier of the institution is obtained through the smart contract deployed.

In a second aspect, the present disclosure provides a device for control of blockchain data access based on a smart contract, including:

an acquisition unit, configured to obtain an access operation request of an institution, wherein the access operation request includes a transaction identifier of a transaction to be accessed;

a processing unit, configured to determine a blockchain state corresponding to the transaction identifier according to the transaction identifier, wherein the blockchain state includes a hash value of a transaction corresponding to the last time change of the blockchain state, and to perform data access control on the institution according to the hash value of the transaction corresponding to the last time change of the blockchain state and the identifier of the institution, obtaining control result; and a transmission unit, configured to transmit the control result to the institution.

Optionally, the processing unit is specifically configured to:

according to the hash value of the transaction corresponding to the last time change of the blockchain state, determine a timestamp of the block corresponding to the hash value;

according to the identifier of the institution, determine a timestamp of the configuration block of the institution;

determine whether the timestamp of the configuration block of the institution is earlier than the timestamp of the block corresponding to the hash value; and when the timestamp of the configuration block of the institution is earlier than the timestamp of the block corresponding to the hash value, execute an access operation of the institution, and determine result of the access operation as the control result, and when the timestamp of the configuration block of the institution is not earlier than the timestamp of the block corresponding to the hash value, determine that the institution is not authorized to access the transaction, and determine access denial information as the control result.

Optionally, the processing unit is also configured to:

before obtaining the access operation request of the institution, obtain a transaction identifier of a transaction to be executed;

execute the transaction to be executed and write transaction data into a block; and when confirming that transaction data are changed, update the blockchain state, and store a hash value of the block in the blockchain state.

Optionally, the blockchain state is a state of latest execution of the transaction corresponding to the transaction identifier.

Optionally, the identifier of the institution is obtained through the smart contract deployed.

In a third aspect, the present disclosure provides a computing facility, including a memory, configured to store a program instruction; and a processor, configured to call the program instruction stored in the memory, and according to the program instruction obtained, execute the method provided by the present disclosure.

In a fourth aspect, the present disclosure provides a computer-readable non-volatile storage medium, including a computer-readable instruction. When a computer reads and executes the computer-readable instruction, the computer executes the method provided by the present disclosure.

BRIEF DESCRIPTION OF THE DRAWINGS

To clearly illustrate technical solutions of the present disclosure, accompanying drawings, required for description of disclosed embodiments, are briefly described hereinafter. Obviously, the accompanying drawings in following description merely illustrate certain embodiments of the present disclosure. Other drawings derived from the accompanying drawings may be obtained by those skilled in the art without creative work.

DETAILED DESCRIPTION

To make the objectives, technical solutions and advantages of the present disclosure clearer and more explicit, the present disclosure is described in further detail with accompanying drawings and embodiments. Obviously, the embodiments described are merely a part of the embodiments of the present disclosure, not all the embodiments of the present disclosure. Based on the described embodiments of the present disclosure, all other embodiments that may be obtained by those skilled in the art without creative work fall within the protection scope of the present disclosure.

Figure 1:
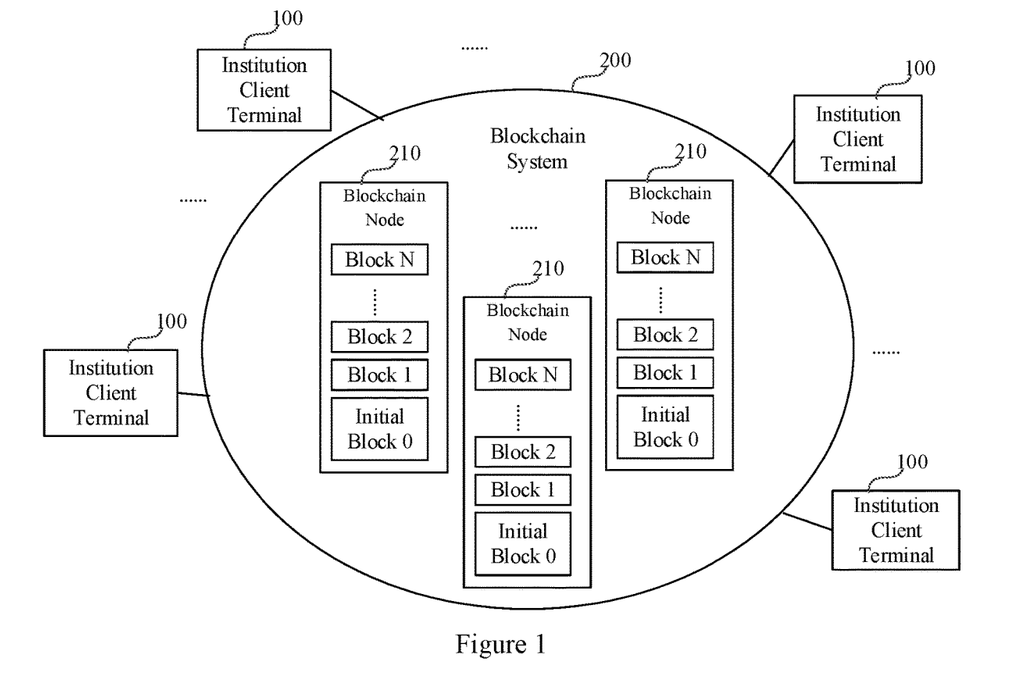
FIG. 1 illustrates a schematic of a system architecture, consistent with the disclosed embodiments of the present disclosure.

FIG. 1 illustrates a schematic of a system architecture, consistent with the disclosed embodiments of the present disclosure. The system architecture may include a plurality of institution client terminals 100 and a blockchain system 200.

An institution client terminal 100 of the plurality of institution client terminals 100 is configured to communicate with the blockchain system 200, and transmit transaction data to the blockchain system 200 for processing the transaction data and uploading the transaction data to the chain.

The blockchain system 200 includes a plurality of blockchain nodes 210 communicating with the plurality of institution client terminals 100 for processing and storing the transaction data transmitted by the plurality of institution client terminals 100. The plurality of blockchain nodes 210 may be connected to each other for communication. Each blockchain node 210 of the plurality of blockchain nodes 210 may include a plurality of blocks. A block of the plurality of blocks is configured to store the transaction data transmitted by the institution client terminal 100.

It should be noted that the structure shown in FIG. 1 is an example only. The present disclosure does not limit a specific structure.

Figure 2:
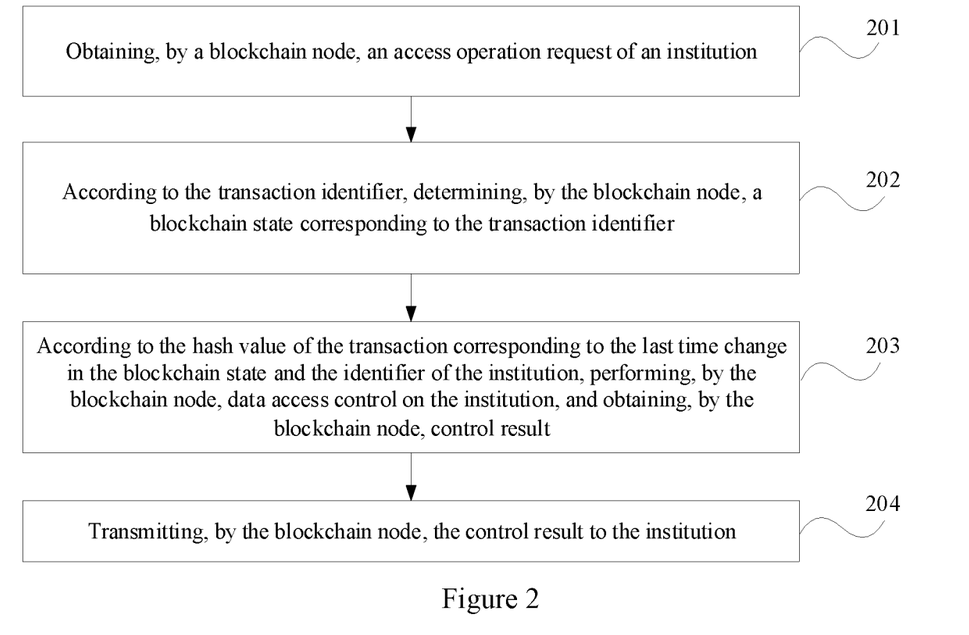
FIG. 2 illustrates a flowchart of a method for control of blockchain data access based on a smart contract, consistent with the disclosed embodiments of the present disclosure.

Based on the above description, FIG. 2 illustrates a flowchart of a method for control of blockchain data access based on a smart contract, consistent with the disclosed embodiments of the present disclosure. A process illustrated by FIG. 2 may be executed by a device for control of blockchain data access based on a smart contract. The device may be located in the blockchain node 210 shown in FIG. 1, or may include the blockchain node 210 shown in FIG. 1.

As shown in FIG. 2, the process specifically includes step 201, step 202, step 203, and step 204.

In the step 201, the blockchain node 210 obtains an access operation request of an institution.

The access operation request may include a transaction identifier of a transaction to be accessed. A corresponding blockchain state may be obtained through the transaction identifier. The transaction identifier may be a transaction ID.

In specific implementation, the institution client terminal may establish a calling relationship with the blockchain system through a software development kit (SDK), and then the institution client terminal may initiate a transaction process through the SDK. By operating a key value transmitted in, a hash value of a block including a latest transaction changing a blockchain state, stored in the blockchain state, may be obtained.

Before obtaining the access operation request of the institution, when executing each transaction, the hash value may need to be written to the blockchain state. The blockchain state may be a state of executing a latest transaction corresponding to the transaction identifier.

Specifically, the blockchain node obtains a transaction identifier of the transaction to be executed, then executes the transaction to be executed, and writes transaction data to a block. Finally, when it is confirmed that the transaction data are changed, the blockchain node update the blockchain state, and store the hash value of the block in the blockchain state.

In the step 202, according to the transaction identifier, the blockchain node determines a blockchain state corresponding to the transaction identifier.

The blockchain state includes the hash value of the transaction corresponding to the last time change of the blockchain state. The blockchain state is a state when the latest transaction corresponding to the transaction identifier is executed.

For the data uploaded on the chain, a hash field of the block including the latest transaction is added to the blockchain state. The hash field only retains the hash value of the block including the latest transaction changing the state. The blockchain state may be implemented using a key value database such as LevelDb or couchDb. Accordingly, when performing a data operation, the hash field of the block may be first obtained through the key value (transaction identifier).

Figure 3:
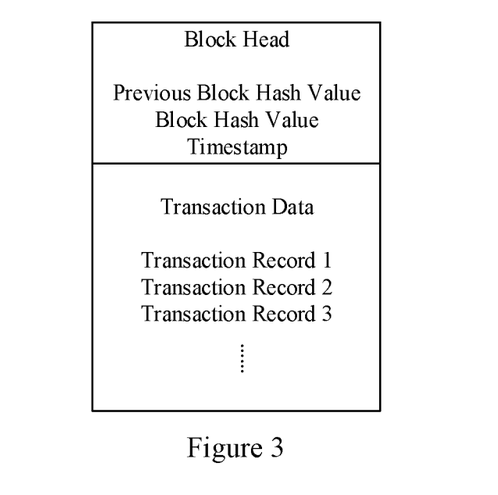
FIG. 3 illustrates a schematic of a block, consistent with the disclosed embodiments of the present disclosure.

FIG. 3 illustrates a schematic of a block, consistent with the disclosed embodiments of the present disclosure. A data structure of a single block is shown in FIG. 3.

In the step 203, according to the hash value of the transaction corresponding to the last time change in the blockchain state and the identifier of the institution, the blockchain node performs data access control on the institution, and obtains control result.

Specifically, according to the hash value of the transaction corresponding to the last time change in the blockchain state, the blockchain node determines the timestamp of the block corresponding to the hash value. Then the blockchain node determines the timestamp of the configuration block of the institution according to the identifier of the institution. Finally, the blockchain node determines whether the timestamp of the configuration block of the institution is earlier than the timestamp of the block corresponding to the hash value. When the timestamp of the configuration block of the institution is earlier than the timestamp of the block corresponding to the hash value, the blockchain node executes the access operation of the institution, and determines the result of the access operation as the control result. When the timestamp of the configuration block of the institution is not earlier than the timestamp of the block corresponding to the hash value, the blockchain node determines that the institution is not authorized to access the transaction, and access denial information is determined to be the control result.

In other words, the block may be queried through the hash value of the block to obtain the timestamp of the block. The timestamp of the block is the time when the transaction data are uploaded on the chain. When the institution joins the alliance, a corresponding configuration block may be generated, and the timestamp of the configuration block may be obtained. The timestamp of the configuration block is a joining time of the block. Accordingly, the institution's ID, time, and the transaction hash of the institution's operation of joining alliance may be uploaded to the blockchain for storage, and this process may be executed only once when the institution joins. After the institution joins, this process may not be authorized any more. In this way, uniqueness of the institution's joining time may be guaranteed.

The certificate and ID of the institution may be read through a smart contract deployed, and the time when the institution joins the alliance may be obtained through the institution ID.

The time when the institution joins the alliance and the time when the data are uploaded on the chain may be compared. When the time when the institution joins the alliance is later than the time when the data are uploaded on the chain, the institution may not have right to operate the data. When the time when the institution joins the alliance is earlier than the time when the data are uploaded on the chain, the result of the operation may be returned.

In the step 204, the blockchain node transmits the control result to the institution.

After the control result is obtained, the control result may be transmitted to the institution to effectively control the data access of the institution.

To better explain the present disclosure, the process of the control of blockchain data access mentioned above is described below in specific scenarios.

Embodiment One

This embodiment uses a payment voucher blockchain platform with Fabric as a bottom layer of the blockchain. The platform is assumed to be established by a tax bureau and a medical insurance department first, and then a social security department joins the platform. The tax bureau and the medical insurance department, due to the previous online operation, already generate a part of data and share this part of data. The social security department joins the platform subsequently. Since the part of data generated before social security department joins the platform is generated by business processes of the tax bureau and the medical insurance department, the tax bureau and the medical insurance department do not want and do not need to share this part of data with the social security department. Therefore, a contract for data access control according to the joining time of an institution may be deployed on the alliance constructed by the tax bureau, the social security department, and the medical insurance department. By using Go language, the time when the social security department joins the alliance may be obtained, and the hash value of the block including the transaction that finally changes the state of the block state may be obtained. The hash value may be used to read the timestamp of the block including the transaction. The two timestamps may be compared to determine whether the institution has the authority to read the voucher data.

In addition to original documents, the fields in the state also need to store the hash value of the block including the latest transaction that changes the state. An institution client terminal of each institution may be a business system developed by the institution according to own needs of the institution. SDK is a package based on an original SDK officially provided by the Fabric platform, and may be more convenient to use than the original SDK.

Based on the above architecture, steps for the payment voucher blockchain platform to control institution data access may be as follows:

1. The client terminal of the social security department establishes a connection with the Fabric platform through the SDK, and uploads the certificate and ID of the social security department.

2. The client terminal of the social security department initiates a process of operating data through the SDK.

3. By operating the key value transmitted in, a hash value of a block including a latest transaction changing a blockchain state, stored in the blockchain state, may be obtained.

4. Through the hash value of the block, the block may be queried to obtain the timestamp of the block. The timestamp is the time when the data are uploaded on the chain.

5. When a social security department joins the alliance, a corresponding configuration block may be generated, and a timestamp of the configuration block may be obtained. The timestamp of the configuration block is the time when the social security department joins the alliance. The institution ID, time, and transaction ID of the operation of the institution joining the alliance may be uploaded to the blockchain for storage.

6. The certificate and institution ID of the institution may be read by calling the smart contract. The time when the institution joins the alliance may be obtained through the institution ID.

7. The time when the social security department joins the alliance and the time when the data are uploaded on the chain may be compared. When the time when the institution joins the alliance is later than the time when the data are uploaded on the chain, the institution does not have the right to perform corresponding operation on the data. When the time when the institution joins the alliance is earlier than the time when the data are uploaded on the chain, the social security department has the operation authority for the data and may perform subsequent operations.

Embodiment Two

This embodiment adopts a hospital medical record sharing platform with Ethereum as the bottom layer. The platform is assumed to be jointly built by hospital A and hospital B. During the earlier online operation, the hospitals A and B share medical records of patients in this period. This part of data is jointly generated and used by the hospitals A and B. When hospital C joins the alliance, the hospitals A and B may not let the hospital C to gain access to the data before the hospital C joins the alliance. It may be unfair to the hospitals A and B that the hospital C has access to all data as soon as the hospital C joins the alliance. Accordingly, a contract for data access control according to the joining time of the institutions may be deployed on the alliance constructed by the hospitals A, B, and C. By using Solidity language, the time when the hospital C joins the alliance may be obtained, and the hash value of the block including the transaction that ultimately changes the patient's medical record state may be obtained. The hash value may be used to read the timestamp of the block including the transaction. The two timestamps may be compared to determine whether the institution has the authority to read the patient's medical record data.

In addition to original medical record of patients, the fields in the state may also need to store the hash value of the block including the latest transaction that changes the state. An institution client terminal of each institution is a business system developed by the institution according to own needs of the institution. The SDK is a package based on the original SDK officially provided by Ethereum, and may be more convenient to use than the original SDK.

Based on the above architecture, steps for the hospital medical record sharing platform to control the access to institution data are as follows:

1. The client terminal of the hospital C establishes a connection with the Ethereum platform through the SDK, and uploads the certificate of the hospital C and the ID of the hospital C.

2. The client terminal of the hospital C initiates a process of operating data through the SDK;

3. By operating the key value transmitted in, the hash value of the block including the transaction corresponding to the last time change of a patient's medical record in the patient's medical record state may be obtained.

4. Through the hash value of the block, the block may be queried, and the timestamp of the block may be obtained. The timestamp is the time when the patient's medical record data are uploaded on the chain.

5. The operation of the hospital C joining the alliance may generate a corresponding configuration block. The timestamp of the configuration block may be obtained, and the timestamp of the configuration block is the time when the hospital C joins the alliance. The ID of the hospital C, the time of joining the alliance, and the transaction ID of the operation of the hospital C joining the alliance may be uploaded to the blockchain for storage.

6. The certificate and institution ID of the institution may be read by calling the smart contract. The time when the institution joins the alliance may be obtained through the institution ID.

7. The time when the hospital C joins the alliance and the time when the data are uploaded on the chain may be compared. When the time when the hospital C joins the alliance is later than the time when the patient's medical record is uploaded on the chain, the hospital C has no right to perform the corresponding operations on the data. When the time when the hospital C joins the alliance is earlier than the time when the patient's medical record is uploaded on the chain, the hospital C has the operation authority for the data, and may perform subsequent operations.

The above embodiment shows that the blockchain node may obtain the institution access operation request, including the transaction identifier of the transaction to be accessed. According to the transaction identifier, the blockchain state corresponding to the transaction identifier may be determined. The blockchain state includes the hash value of the transaction corresponding to the last time change of the blockchain state. According to the hash value of the transaction corresponding to the last time change of the blockchain state and the identifier of the institution, data access control may be performed on the institution. The control result may thus be obtained and transmitted to the institution. Accordingly, the blockchain node may obtain the timestamp of the corresponding transaction data and the joining time of the institution through the identifier of the institution and the hash value of the transaction corresponding to the last time change of the state. Data access by the institution may thus be controlled according to the timestamp and the joining time of the institution. As such, the effect of controlling the node joining the alliance later from accessing the data before the node joins the alliance may be improved, and the control efficiency may be improved.

Figure 4:
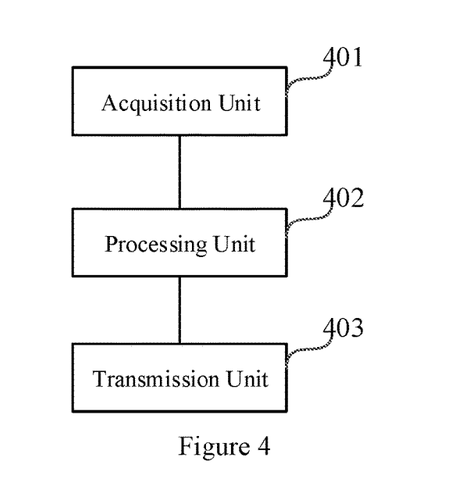
FIG. 4 illustrates a structural schematic of a device for control of blockchain data access based on a smart contract, consistent with the disclosed embodiments of the present disclosure.

Based on the same technical idea, FIG. 4 illustrates a structural schematic of a device for control of blockchain data access based on a smart contract, consistent with the disclosed embodiments of the present disclosure. The device may execute a process for blockchain data access control based on a smart contract.

As shown in FIG. 4, the device specifically includes an acquisition unit 401, a processing unit 402, and a transmission unit 403.

The acquisition unit 401 is configured to obtain an access operation request of an institution. The access operation request may include a transaction identifier of a transaction to be accessed.

The processing unit 402 is configured to determine a blockchain state corresponding to the transaction identifier according to the transaction identifier. The blockchain state may include a hash value of the transaction corresponding to the last time change of the blockchain state. The processing unit 402 is also configured to perform data access control on the institution, according to the hash value of the transaction corresponding to the last time change of the blockchain state and the identifier of the institution, to obtain the control result.

The transmission unit 403 is configured to transmit the control result to the institution.

Optionally, the processing unit 402 is specifically configured to:

according to the hash value of the transaction corresponding to the last time change of the blockchain state, determine a timestamp of the block corresponding to the hash value;

according to the identifier of the institution, determine the timestamp of the configuration block of the institution;

determine whether the timestamp of the configuration block of the institution is earlier than the timestamp of the block corresponding to the hash value;

when the timestamp of the configuration block of the institution is earlier than the timestamp of the block corresponding to the hash value, execute the access operation of the institution, and determine the result of the access operation as the control result, and when the timestamp of the configuration block of the institution is not earlier than the timestamp of the block corresponding to the hash value, determine that the institution is not authorized to access the transaction, determining the access denial information as the control result.

Optionally, the processing unit 402 is also configured to:

before obtaining the access operation request of the institution, obtain the transaction identifier of the transaction to be executed;

execute the transaction to be executed and write the transaction data into a block; and when confirming that the transaction data are changed, update the blockchain state, and store the hash value of the block in the blockchain state.

Optionally, the blockchain state is a state of the latest execution of the transaction corresponding to the transaction identifier.

Optionally, the identifier of the institution may be obtained through the smart contract deployed.

Based on the same technical concept, the present disclosure provides a facility for blockchain data access control based on a smart contract. The facility includes at least one processor, and a memory communicatively connected with the at least one processor. The memory stores an instruction. The instruction may be executed by the at least one processor, such that the at least one processor may execute a method for blockchain data access control based on a smart contract provided by the present disclosure.

Figure 5:
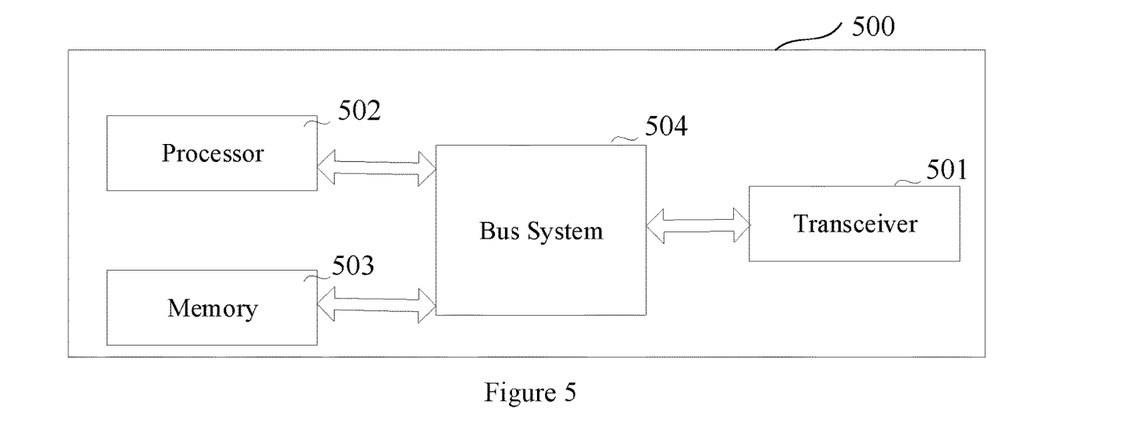
FIG. 5 illustrates a structural schematic of a facility for control of blockchain data access based on a smart contract, consistent with the disclosed embodiments of the present disclosure.

Taking one processor as an example, FIG. 5 illustrates a structural schematic of a facility for control of blockchain data access based on a smart contract, consistent with the disclosed embodiments of the present disclosure. As shown in FIG. 5, the facility 500 for control of blockchain data access based on a smart contract includes a transceiver 501, a processor 502, a memory 503, and a bus system 504.

The memory 503 is configured to store a program. Specifically, the program may include a program code. The program code may include a computer operation instruction. The memory 503 may be a random-access memory (RAM), or may be a non-volatile memory, for example, at least one disk memory. FIG. 5 only shows one memory. Of course, according to needs, the facility may include a plurality of memories. The memory 503 may also be a memory in the processor 502.

The memory 503 may store an operation instruction and an operation system. The operation instruction and the operation system may execute a module or a data structure, or a subset thereof, or an extended set thereof.

The operation instruction includes various operation instructions, and may be used to realize various operations.

The operation system includes various system programs, and may be used to realize various basic services and process hardware-based tasks.

The above-mentioned method for blockchain data access control based on a smart contract provided by the present disclosure may be applied to the processor 502, or implemented by the processor 502. The processor 502 may include an integrated circuit chip, and have a signal processing capability. In an implementation process, steps of the above-mentioned method for blockchain data access control based on a smart contract may be completed by an integrated logic circuit in hardware of the processor 502 or an instruction in form of software of the processor 502. The processor 502 may be a general-purpose processor, a digital signal processor (DSP), an application specific integrated circuit (ASIC), a field programmable gate array (FPGA) or other programmable logic device, a discrete gate or transistor logic device, or a discrete hardware component. The methods, steps, and logical block diagrams provided by the present disclosure may thus be implemented or executed. The general-purpose processor may be a microprocessor, or may be any conventional processor or the like. The steps of the method provided by the present disclosure may be executed and completed by a hardware decoding processor, or executed and completed by a combination of hardware and software modules in a decoding processor. The software module may be located in a well-developed storage medium in the field, such as a random-access memory, a flash memory, a read-only memory, a programmable read-only memory, an electrically erasable programmable memory, or a register. The storage medium may be located in the memory 503. The processor 502 may read information in the memory 503, and in combination with following hardware, execute corresponding steps.

The transceiver 501 is configured to obtain an access operation request of an institution. The access operation request may include a transaction identifier of a transaction to be accessed.

The processor 502 is configured to determine a blockchain state corresponding to the transaction identifier according to the transaction identifier. The blockchain state may include a hash value of the transaction corresponding to the last time change of the blockchain state. The processor 502 is also configured to perform data access control on the institution according to the hash value of the transaction corresponding to the last time change of the blockchain state and the identifier of the institution to obtain the control result.

The transceiver 501 is configured to transmit the control result to the institution.

Optionally, the processor 502 is configured to, according to the hash value of the transaction corresponding to the last time change of the blockchain state, determine a timestamp of the block corresponding to the hash value; according to the identifier of the institution, determine the timestamp of the configuration block of the institution; and determine whether the timestamp of the configuration block of the institution is earlier than the timestamp of the block corresponding to the hash value. When the timestamp of the configuration block of the institution is earlier than the timestamp of the block corresponding to the hash value, the processor may execute the access operation of the institution, and determine the result of the access operation as the control result. When the timestamp of the configuration block of the institution is not earlier than the timestamp of the block corresponding to the hash value, the processor may determine that the institution is not authorized to access the transaction, and determine the access denial information as the control result.

Optionally, the processor 502 is also configured to, before obtaining the access operation request of the institution, obtain the transaction identifier of the transaction to be executed, execute the transaction to be executed and write the transaction data into the block, and when confirming that the transaction data are changed, update the blockchain state, and store the hash value of the block in the blockchain state.

Optionally, the blockchain state is a state of the latest execution of the transaction corresponding to the transaction identifier.

Optionally, the identifier of the institution may be obtained through the smart contract deployed.

Based on the same technical concept, the present disclosure also provides a computing facility, including:
a memory, configured to store one or more program instructions; and
a processor, configured to call the program instructions stored in the memory, and execute a method for blockchain data access control based on a smart contract, according to the one or more program instructions.

Based on the same technical concept, the present disclosure also provides a computer-readable non-volatile storage medium, including one or more computer-readable instructions. When a computer reads and executes the one or more computer-readable instructions, the computer executes the method for blockchain data access control based on a smart contract provided by the present disclosure.

The present disclosure is described with reference to flowcharts and/or block diagrams of methods, devices (systems), and computer program products according to various embodiments of the present disclosure. It should be understood that each process and/or block in the flowcharts and/or block diagrams, and the combination of processes and/or blocks in the flowcharts and/or block diagrams may be implemented by computer program instructions. Such computer program instructions may be provided to a processor of a general-purpose computer, a special-purpose computer, an embedded processor, or other programmable data processing apparatus, such that the instructions executed by the processor of the computer or other programmable data processing apparatus may implement functions specified in one or more processes in the flowcharts and/or one or more blocks in the block diagrams.

Such computer program instructions may also be stored in a computer-readable memory that may direct a computer or other programmable data processing apparatus to work in a specific manner, such that the instructions stored in the computer-readable memory may produce a manufacturing article including an instruction device. The instruction device may implement functions specified in one or more processes in the flowcharts and/or one or more blocks in the block diagrams.

Such computer program instructions may also be loaded on a computer or other programmable data processing apparatus, such that a series of operation steps may be executed on the computer or other programmable apparatus to produce computer-implemented processing. Accordingly, the instructions executed by the processor of the computer or other programmable data processing apparatus may implement functions specified in one or more processes in the flowcharts and/or one or more blocks in the block diagrams.

Although preferred embodiments of the present disclosure have been described, those skilled in the art may make changes and modifications to these embodiments once they learn the basic creative concept. As such, the appended claims may be interpreted as including the preferred embodiments and all changes and modifications falling within the scope of the present disclosure.

Obviously, those skilled in the art may make various changes and modifications to the present disclosure without departing from the spirit and scope of the present disclosure. Accordingly, if these modifications and variations of the present disclosure fall within the scope of the claims of the present disclosure and their equivalent technologies, the present disclosure may intend to include these modifications and variations.

What is claimed is:

1. A method for control of blockchain data access based on a smart contract, comprising:
obtaining, by a blockchain node, an access operation request of an institution, wherein the access operation request includes a transaction identifier of a transaction to be accessed;
according to the transaction identifier, determining, by the blockchain node, a blockchain state corresponding to the transaction identifier, wherein the blockchain state includes a hash value of a transaction corresponding to a last time change of the blockchain state;
according to the hash value of the transaction corresponding to the last time change in the blockchain state and an identifier of the institution, performing, by the blockchain node, data access control on the institution to obtain a control result, wherein performing the data access control comprises:
according to the hash value of the transaction corresponding to the last time change in the blockchain state, determining a timestamp of a block corresponding to the hash value;
according to the identifier of the institution, determining a timestamp of a configuration block of the institution;
determining whether the timestamp of the configuration block of the institution is earlier than the timestamp of the block corresponding to the hash value; and
when the timestamp of the configuration block of the institution is earlier than the timestamp of the block corresponding to the hash value, executing an access operation of the institution, determining result of the access operation as the control result, and when the timestamp of the configuration block of the institution is not earlier than the timestamp of the block corresponding to the hash value, determining that the institution is not authorized to access the transaction, and determining access denial information as the control result; and transmitting, by the blockchain node, the control result to the institution.

2. The method according to claim 1, before obtaining, by the blockchain node, the access operation request of the institution, further comprising:

obtaining a transaction identifier of a transaction to be executed;

executing the transaction to be executed, and writing transaction data to a block; and when confirming that the transaction data are changed, updating the blockchain state, and storing a hash value of the block in the blockchain state.

3. The method according to claim 1, wherein:

the blockchain state is a state of latest execution of the transaction corresponding to the transaction identifier.

4. The method according to claim 1, wherein:

the identifier of the institution is obtained through the smart contract deployed.

5. A device for control of blockchain data access based on a smart contract, comprising:

a transceiver, configured to obtain an access operation request of an institution, wherein the access operation request includes a transaction identifier of a transaction to be accessed; and a processor, configured to determine a blockchain state corresponding to the transaction identifier according to the transaction identifier, wherein the blockchain state includes a hash value of a transaction corresponding to the last time change of the blockchain state, and to perform data access control on the institution according to the hash value of the transaction corresponding to the last time change of the blockchain state and the identifier of the institution, obtaining control result, wherein when performing the data access control, the processor is further configured to:

according to the hash value of the transaction corresponding to the last time change of the blockchain state, determine a timestamp of the block corresponding to the hash value;

according to the identifier of the institution, determine a timestamp of the configuration block of the institution;

determine whether the timestamp of the configuration block of the institution is earlier than the timestamp of the block corresponding to the hash value; and when the timestamp of the configuration block of the institution is earlier than the timestamp of the block corresponding to the hash value, execute an access operation of the institution, and determine result of the access operation as the control result, and when the timestamp of the configuration block of the institution is not earlier than the timestamp of the block corresponding to the hash value, determine that the institution is not authorized to access the transaction, and determine access denial information as the control result; and the transceiver is further configured to transmit the control result to the institution.

6. The device according to claim 5, wherein the processor is further configured to:

before obtaining the access operation request of the institution, obtain a transaction identifier of a transaction to be executed;

execute the transaction to be executed and write transaction data into a block; and when confirming that transaction data are changed, update the blockchain state, and store a hash value of the block in the blockchain state.

7. The device according to claim 5, wherein:

the blockchain state is a state of latest execution of the transaction corresponding to the transaction identifier.

8. The device according to claim 5, wherein:

the identifier of the institution is obtained through the smart contract deployed.

9. A non-transitory computer-readable storage medium, comprising one or more computer-readable instructions, wherein:

when a blockchain node reads and executes the one or more computer-readable instructions, the blockchain node executes the following operations:

obtaining an access operation request of an institution, wherein the access operation request includes a transaction identifier of a transaction to be accessed;

according to the transaction identifier, determining a blockchain state corresponding to the transaction identifier, wherein the blockchain state includes a hash value of a transaction corresponding to a last time change of the blockchain state;

according to the hash value of the transaction corresponding to the last time change in the blockchain state and an identifier of the institution, performing data access control on the institution to obtain a control result, wherein performing the data access control comprises:

according to the hash value of the transaction corresponding to the last time change in the blockchain state, determining a timestamp of a block corresponding to the hash value;

according to the identifier of the institution, determining a timestamp of a configuration block of the institution;

determining whether the timestamp of the configuration block of the institution is earlier than the timestamp of the block corresponding to the hash value; and when the timestamp of the configuration block of the institution is earlier than the timestamp of the block corresponding to the hash value, executing an access operation of the institution, determining result of the access operation as the control result, and when the timestamp of the configuration block of the institution is not earlier than the timestamp of the block corresponding to the hash value, determining that the institution is not authorized to access the transaction, and determining access denial information as the control result; and transmitting the control result to the institution.

* * * * *